US006977774B1

(12) United States Patent
Kawakami et al.

(10) Patent No.: US 6,977,774 B1
(45) Date of Patent: Dec. 20, 2005

(54) POLARIZER

(75) Inventors: Shojiro Kawakami, Miyagi-ken (JP); Yasuo Otera, Miyagi-ken (JP); Takayuki Kawashima, Miyagi-ken (JP)

(73) Assignee: Autocloning Technology, Ltd., Miyagi (JP)

( * ) Notice: Subject to any disclaimer, the term of this patent is extended or adjusted under 35 U.S.C. 154(b) by 0 days.

(21) Appl. No.: 09/762,497

(22) PCT Filed: Aug. 9, 1999

(86) PCT No.: PCT/JP99/04297

§ 371 (c)(1),
(2), (4) Date: Apr. 20, 2001

(87) PCT Pub. No.: WO00/08496

PCT Pub. Date: Feb. 17, 2000

(30) Foreign Application Priority Data

Aug. 7, 1998 (JP) ................................. 10/257426

(51) Int. Cl.[7] ........................... G02B 27/28; G02B 5/30
(52) U.S. Cl. ...................... 359/488; 359/485; 359/497; 359/500
(58) Field of Search ............................... 359/485, 638, 359/487–490, 495, 530, 589, 497, 500

(56) References Cited

U.S. PATENT DOCUMENTS

| 5,422,756 | A | * | 6/1995 | Weber | ........................ 359/487 |
| 5,559,634 | A | * | 9/1996 | Weber | ........................ 359/638 |
| 6,111,697 | A | * | 8/2000 | Merrill et al. | ............... 359/497 |

FOREIGN PATENT DOCUMENTS

| JP | 61-17103 | A | 1/1986 | ............ G02B 5/30 |
| JP | 61-262705 | A | 11/1986 | ............ G02B 5/30 |
| JP | 62-269104 | A | 11/1987 | ............ G02B 5/30 |
| JP | 62-289804 | A | 12/1987 | ............ G02B 5/30 |
| JP | 3-75705 | A | 3/1991 | ............ G02B 5/30 |
| JP | 4-36703 | A | 2/1992 | ............ G02B 5/30 |
| JP | 5-215919 | A | 8/1993 | ............ G02B 5/30 |
| JP | 0145124 | | * 11/1997 | |
| JP | 09304611 | A | 11/1997 | ............ G02B 5/18 |
| JP | 10059746 | A | 3/1998 | ........... C03C 17/34 |

OTHER PUBLICATIONS

International Preliminary Examination Report including cover sheet, Box I, Box V, Supplemental Box, and Box VIII.
Cheng, Chuan C., Scherer, Axel, Tyan, Rong-Chung, Fainman, Yeshayahu, Witzgall, George, and Yablonovitch, Eli, "New Fabrication Techniques for High Quality Photonic Crystals," American Vacuum Society, pp. 2764-2767, Nov./Dec. 1997.

(Continued)

Primary Examiner—Leonidas Boutsikaris
(74) Attorney, Agent, or Firm—Randall J. Knuth

(57) ABSTRACT

A polarizer which has and regularly arranged two-dimensional structure which has a pitch of 1 mm or so or less. The polarizer has structure in which two or more film-shaped materials which have a substantially regularly arranged one-dimensional undulation. The polarizer also has a substantially regularly arranged two-dimensional structure. For example, the polarizer consist of materials 1 and 2 which have different refractive indexes. A regularly arranged two-dimensional structure which has a pitch of 1 mm or less can be obtained by a simple method. Because of this structure, the polarizer transmits the incident light which has a specific polarized plane and reflects the incident light which has a polarized plane which is orthogonal to the plane.

7 Claims, 6 Drawing Sheets

OTHER PUBLICATIONS

The Electronics Society,"The Transactions of the Institute of Electronics, Information and Communication Engineers C-I," The Institute of Electronics, Information and Communication Engineers, vol. J81-C-I No. 2, pp. 108-109, Feb. 1998.

"Physical Review B, Condensed Matter," The American Physical Society, vol. 54, No. 16, pp. 11245-11251, Oct. 15, 1996.

Cassagne, D., Jouanin, C., and Bertho, D., "Hexagonal Structures for Two-dimensional Photonic Crystals," pp. 341-344, 1996.

Cassagne, D., Jouanin, C., and Bertho, D., "Two-dimensional Photonic Band Gaps: New Hexagonal Structures," pp. 497-505, 1996.

Kawakami, Shojiro, Hanaizumi, Osamu, Sato, Takashi, Ohtera, Yasuo, and Kawashima, Takayuki, "Fabrication and Observation of 3D Photonic Crystals Composed of Si/SiO$_2$ with Sub-Micrometer Periods,"Research Institute of Electrical Communication, vol., J80-C-I, No. 6, pp. 296-297, 1997.

Kawakami, Shojiro, Sato, Takashi, and Kawashima, Takayuki, "Mechanism of Shape-Formation for 3D Periodic Nanostructures by Bias Sputtering," Research Institute of Electrical Communication, vol., J81-C-I, No. 2, pp. 108-109, 1998.

Hamano, T., Izutsu, M., and Hirayama, H., "Possibility of Polarizer Using 2D Photonic Crystal," 1997.

"Equatran-G All Purpose Equation Solver for Windows," Chemical Industry, vol. 50, No. 1, pp. 47-52, 1999.

Hamano, T., Hirayama, H., and Aoyagi, Y., "Fabrication of Semiconductor 2-Dimensional Photonic Band Crystals Using Selective Growth,"Inst. Phys. Chem. Res., 26p-G-2, 1996.

Hamano, T., Hirayama, H., and Aoyagi, Y., "Fabrication of 2D Photonic Band Crystal Cavity by Selective Growth and its Optical Characteristics, "RIKEN., 30a-NC-11, 1997.

* cited by examiner

POLARIZER

BACKGROUND OF THE INVENTION

1. Field of the Invention

The present invention relates to a polarizer for use in optical instruments utilizing the polarization phenomenon that is a property of the light, the polarizer permitting only the linearly polarized wave in a direction orthogonal thereto.

2. Description of the Related Art

Polarizer is an element which transmits only the light component which vibrates to a specific direction among the non-polarized light or elliptically polarized light whose electric 10- and magnetic field vibrates to non-specific directions to give the linearly polarized light. It is one of the most fundamental optical elements, and is widely used as a device for the optical communication, a pick-up for the optical disc, a liquid crystal display, optics-applying measurements, and so on. Operation modes of it can be roughly grouped into the following two modes: 1) the mode in which unnecessary polarized waves are absorbed, and 2) the mode in which two orthogonalized and polarized wave components which are emitted through the same light path are separated into different light paths. Depending on the purpose of utilizing a polarizer, the polarizer is required to have large aperture area, high performance, and so on or to be thin. It is industrially important to be able to supply such a polarizer inexpensively.

Presently a polarizer is generally practically used which was prepared by doping a polymer film with a dichromic molecule such as iodine in the case of operation mode 1. Although this type of polarizer can be obtained inexpensively and in a large area, its extinction ratio and its temperature stability are low, i.e., it has these faults.

In order to solve those problems, a polarizer prepared with materials having high stability has been developed, i.e., a polarizer prepared by arranging to one direction an absorber such as metal and semiconductor in a transparent body such as glass in minute lines or thin films. Polarized wave components which are parallel to the minute lines or thin films are absorbed or reflected, and polarized waves which are orthogonal to them are transmitted. Although this type of polarizer can have a high extinction ration, steps such as cutting and polishing might be necessary, i.e., it is difficult to reduce the production cost. In addition, it is difficult to produce a thin polarizer which has a large area.

On the other hand, a polarizer which is prepared with double refraction single crystals for operation mode 2 is prepared by sticking two triangular prisms which are made of a material which has a large double refraction coefficient such as calcite. A typical one is made of Gran Thomson prisms. Although this type of polarizer can have generally a high extinction coefficient and transmittance, it is difficult to produce a polarizer which has a large area or a thin one. The material is expensive, therefore the cost is high.

Polarizers utilizing the Brewster angle of a transparent body include a polarized beam splitter using a multilayer dielectric. Although it is inexpensive because it can be easily mass-produced, it has at least the following problems: high polarization is not obtained; miniaturization is difficult; and the wavelength band for use is narrow. Therefore, it is used only for limited purposes.

Each of the above-mentioned polarizers is practically used. On the other hand, very recently, a polarizer is theoretically proposed which utilizes an anisotropy of propagation property of a transparent body regularly arranged structure which has a pitch of the wavelength or shorter (Tetsuko Hamano, Masayuki Izutsu, and Hideki Hirayama, "Possibility of Polarizer Using Two-dimension Photonic Crystal," 58th Applied Physics Autumn Proceedings, paper 2a-W-7, 1977; Akira Sato and Masahiro Takebe "Optically Anisotropic Multilayered Film by Structural Double Refraction," Optics Japan '97 Proceedings, paper 30pD01, 1997). These polarizers have the structure in which thin pillars of a transparent body which has a refractive index which is different from the matrix are arranged two-dimensionally and regularly in a transparent matrix. If the structure satisfies a condition that the pitch is, for example, half-wave length or so, among polarized waves which are parallel and vertical to those pillars, one can be transmitted, and the other can be blocked, i.e., it can work as a polarizer. Actually, however, any method for industrially constructing such structure has not been found, and any experimental example has not been reported.

The present invention was conceived to solve the above-mentioned problems. The object of the present invention is to provide a polarizer which has an excellent extinction ratio and insertion loss property and has a large aperture area in spite of a small optical path length, and allows inexpensive industrial production.

SUMMARY OF THE INVENTION

Background technologies concerning the polarizer of the present invention will be described below. In an artificially and regularly arranged structure consisting of a more refractive medium and a less refractive medium, each of two polarized wave components which are orthogonal to each other has an independent dispersion relation (relation between frequency and wave motion vector). These two polarized wave components are called TE and TM waves depending on which, electric field or magnetic field, is parallel to the longitudinal direction in the two-dimensionally and regularly arranged structure which is closely related to the present invention. Also in the general three-dimensionally and regularly arranged structure, inherent modes are normally grouped into TE-like and TM-like waves. Therefore, these waves are also designated TE and TM waves for convenience in the present invention. TE and TM waves have different band gaps each of which is a frequency band at which the light is not transmitted. At a frequency band, one polarized mode may be blocked while another polarized mode may be a transmitted wave. Namely, at this frequency band, this regularly arranged structure can work as a polarizer which reflects or diffracts one polarized light and transmits another polarized light. In addition, a polarizer which has a sufficiently high extinction ratio is obtained by increasing a frequency.

The present invention is based on 1) the finding of the existence of properties of the plane-type polarizer in the structure which consists of two or more transparent bodies which have different refractive indexes, wherein the shape of the layer which is a unit of lamination has a regularly arranged structure along the x-axis, is uniform along the y-axis, or has a longer pitch than along x-axis, and each layer is laminated along z-axis keeping each shape, in the three-dimensional rectangular coordinate system (x, y, z), i.e., in the structure in which two or more thin films which have regularly arranged pleats, or undulation, are laminated, and 2) the finding of the method for constructing the regularly arranged structure which the applicants have developed. The light is emitted vertically or slantwise to the plane. The aperture area depends on the size of the substrate, so that it is quite easy to enlarge the aperture area. On the other hand, although the optical path length is several times of the wavelength (several mm) or so, so that the polarizer according to the present invention can be approximately $10^{-n}$ (n=−) times thinner than conventional polarizers.

On the other hand, in the method for forming a film using both the diffusion incidence of depositing particles which is represented by both bias spattering and spatter-etching, it is possible to laminate with repeating the undulation of the surface by controlling each of the deposition and the etching. This mechanism can be explained by a combination at an appropriate ratio of the following three effects: 1) the effect in which the deposition rate is retarded in the concave part which becomes a shadow by the diffusion incidence of the depositing particles, (2) the effect in which the etching rate becomes the largest at a plane which gives a tilt angle between approximately 50°–60° in the spatter etching, and 3) the effect in which particles which were removed mainly by the spatter etching are reattached at other places (Shojiro Kawakami, Hisashi Sato, and Takayuki Kawashima, "Mechanism of Formation of 3D Regularly Arranged Nanostructure Which Is Prepared by the Bias Spattering Method," *The Transactions of the Institute of Electronics, Information and Communication Engineers* C-I, Vol.J81-C-I, no. 2, pp. 108–109, February 1998).

This technique allows regularly laminating thin films consisting of two transparent materials with regularly repeating undulation on a substrate on which rows of grooves are regularly arranged without laborious positioning. Namely, this technique allows easily preparing the polarizer according to the present invention.

The present invention allows inexpensively providing a polarizer which has an excellent extinction ratio and insertion loss property, and/or has a large aperture area in spite of a small optical pass length.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
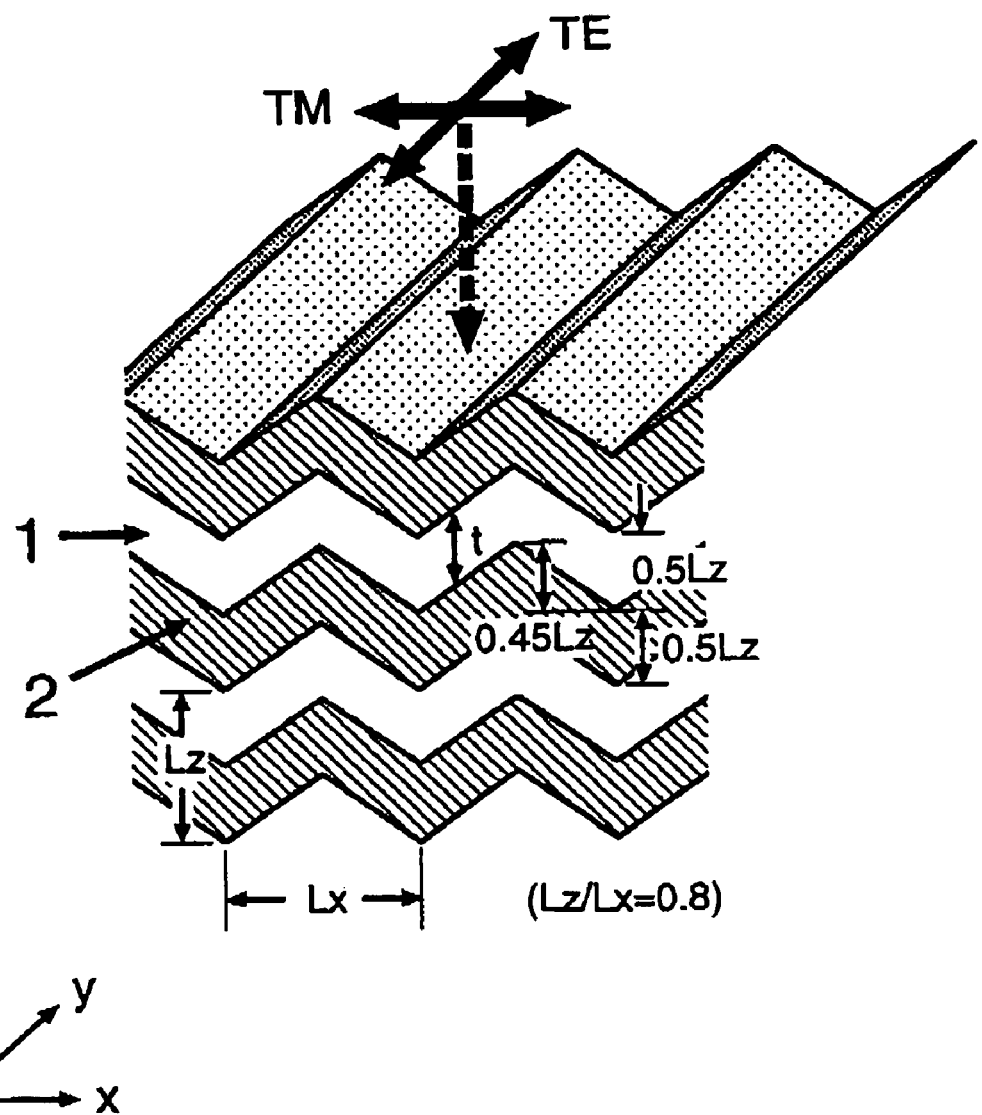
FIG. 1 illustrates the structure of a polarizer of Example 1.

| Explanation of Reference Numerals | |
|---|---|
| 1 | SiO$_2$ layer |
| 2 | Si layer |

| -continued | |
|---|---|
| Explanation of Reference Numerals | |
| 3 | Substrate |
| 4 | Non-reflecting coating layer |
| 5 | Regularly arranged grooves |
| 6 | A frequency band at which a polarizer transmits TM wave |
| 7 | SiO$_2$ layer |
| 8 | Si layer |

FIG. 1 illustrates a polarizer according to the present invention. A polarizer according to the present invention will be described referring to FIG. 1 below.

A transparent medium which has a higher refractive index and a transparent medium which has a lower refractive index are alternately laminated on regularly arranged grooves or rows of linear injections keeping the shape of the interface. Polarizers in the following examples have regular arrangement along x- and z-axes, and are uniform along y-axis. The operation mechanism is similar even if the structure is changed to have regularly or non-regularly arranged structure which has a length larger than x-axis. To the regularly arranged structure thus obtained, non-polarized or elliptically polarized light is emitted along z-axis. To polarized wave parallel to the groove row (y-polarized wave) and polarized wave orthogonal to the wave (x-polarized wave), TE mode and TM mode lights are generated in the regularly arranged structure. If the frequency of the light is in the TE mode and TM mode band gap, however, the mode can not be transmitted in the regularly arranged structure, so that the emitted light is reflected or diffracted. On the other hand, the frequency of the light is in the energy band, the light is transmitted in the regularly arranged structure keeping the wave motion vector. Therefore, it works as a plane-type polarizer.

The wave length band at which TE mode and TM mode band gaps are generated can be arbitrarily changed by controlling the pitch of the groove row (Lx) and the pitch of the direction of the lamination (Lz) of the polarizer according to the present invention. Namely, it is possible to arbitrarily set the wavelength band at which the polarizer works.

In addition, as a less refractive medium, a material containing SiO$_2$ as a main component is most popularly used. SiO$_2$ has a broad transparent wavelength region, is stable chemically, thermally, and mechanically, and allows easy formation fo a film. As a more refractive material an oxide such a TiO$_2$ and the like have a broad transparent wavelength range, so that they can be used also in a visible light region. On the other hand, although the semiconductor is used only in a near infrared region, it has an advantage of a large refractive index.

It is desirable that the polarizer for many purposes can be used in a broad frequency band. A broad frequency band for the polarizer can be taken by appropriately determining the shapes of the more refractive medium layer and the less refractive medium layer. The degree of freedom in the shapes of the more refractive medium layer and the less refractive medium layer is large for monochromic light such as specific laser light, so that the shape can be selected which allows easy repeat in forming film.

Shapes of layers and repeating structure, and methods for preparing them will b described in the following examples.

EXAMPLE 1

Figure 2:
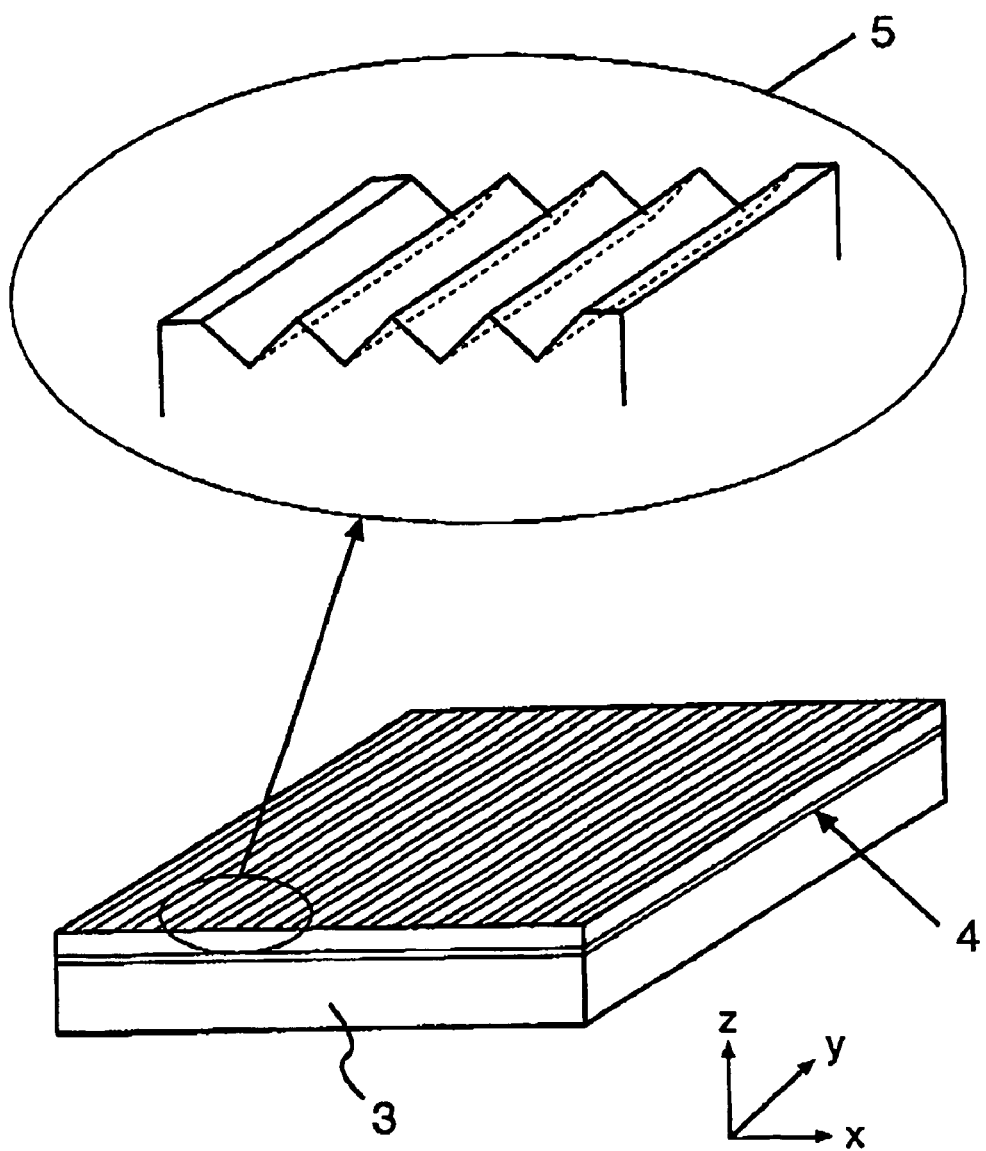
FIG. 2 illustrates a substrate which has grooves on its surface.

FIG. 1 illustrates the structure of a polarizer of Example 1. FIG. 1 illustrates amorphous $SiO_2$ layer 1 and amorphous Si layer 2. A pitch along x-axis (Lx) is 0.4 mm, and a pitch along z-axis (Lz) is 0.32 mm. $SiO_2$ and SiO layers have shapes which were regularly bent with slightly changing thickness "t". A method for preparing the polarizer will be described below. First, regularly arranged grooves were prepared on a substrate by the electric beam lithography and the dry etching. FIG. 2 illustrates quartz glass substrate 3, non-reflecting coating layer 4, and regularly arranged groove part 5. Although non-reflecting coating layer 4 and regularly arranged groove part 5 are generally selected from the substrate depending on the dimension of the regularly arranged structure, they can be the same material as the substrate. The latter case is provided in the example. The width of the groove is 0.4 mm, the depth of the groove is 0.2 mm, and the pitch of the groove to the horizontal direction is 0.4 mm. On this substrate, $SiO_2$ and Si layers were alternately laminated using targets of $SiO_2$ and Si by the bias spattering method. It is important to form films keeping regularly undulated form along the x-axis of each layer. The condition was as follows: To form a film of $SiO_2$, and Ar gas pressure of 1.9 mTorr, a target high frequency electric power of 400W, and substrate high frequency electric power of 60W. To form a film of Si, and Ar gas pressure of 3.6 mTorr and a target high frequency electric power of 400W. Ten $SiO_2$ layers and ten Si layers were laminated.

The reason why the laminated structure shown by FIG. 1 is formed on the substrate which has rectangular grooves shown by FIG. 2 under the condition can be explained by a combination of two or more phenomena selected from the following three phenomena: 1) deposition by dispersion incidence of neutral particles from the target, 2) spatter etching by vertical incidence of Ar ion, and 3) the reattachment of deposited particles.

Figure 3:
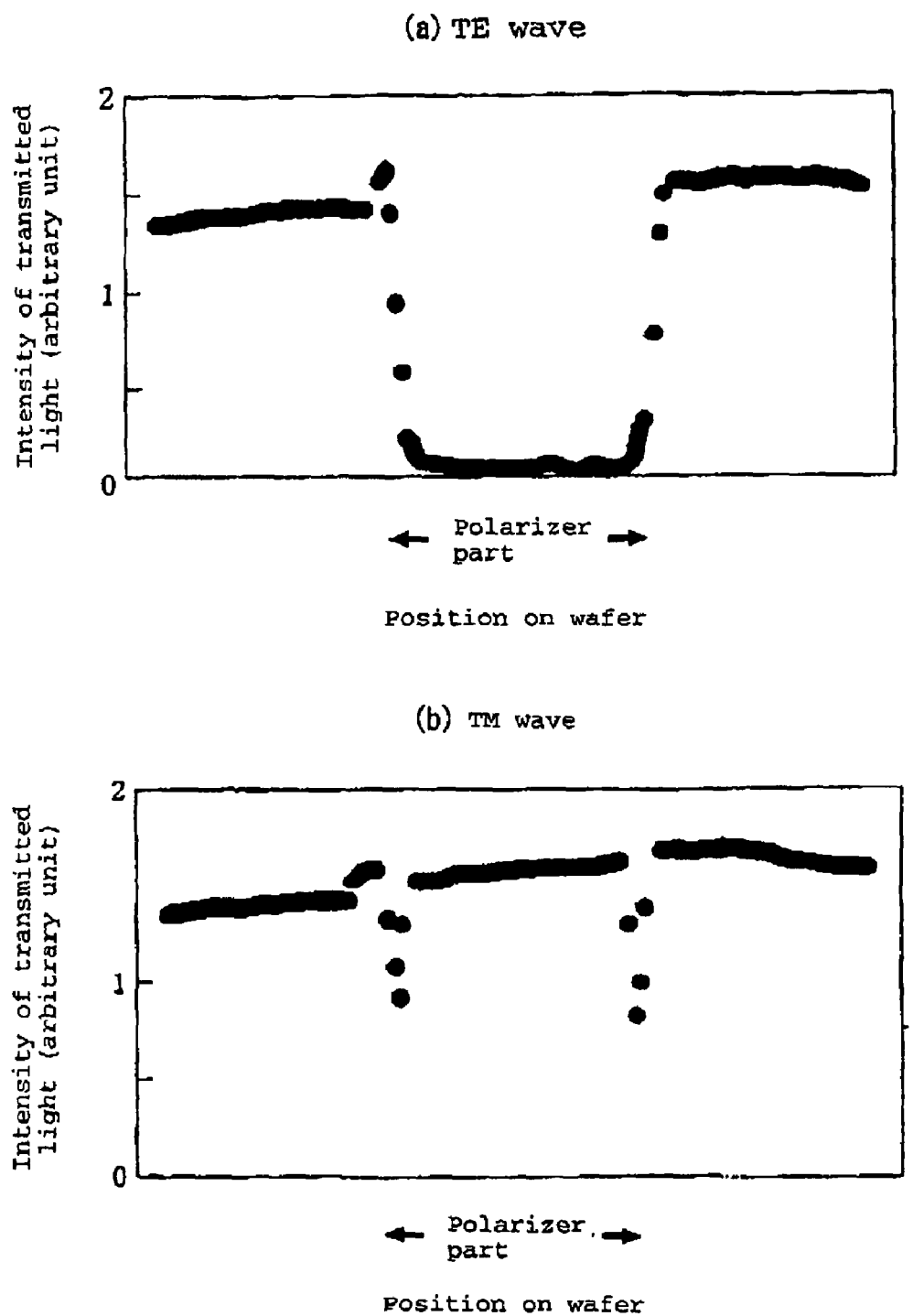
FIG. 3a illustrates the intensity distribution of the transmitted light to TE wave in the near view.
FIG. 3b illustrates the intensity distribution f the transmitted light to TM wave in the near view.

FIGS. 3a and 3b illustrate an intensity distribution of the transmitted light to TE and TM waves at a wavelength of 1.0 mm in the near view in the regularly arranged structure which was thus obtained. The abscissa is the position on a substrate wafer. The central part is a polarizer part. On both sides of the part, the substrate wafer does not have any groove, and parallel layers of Si and $SiO_2$ were deposited. The ordinate is the strength of transmitted light at each point on a substrate wafer. It might be easily understood that the polarizer part substantially blocked TE wave. On the other hand, for TM wave, the difference is minute between the intensity of te transmitted light in the film part which were deposited on a substrate which has no groove on both sides and that of the polarizer part. In other words, TM wave can be transmitted with minute loss by applying a non-reflecting coating on a polarizer part.

Figure 4:
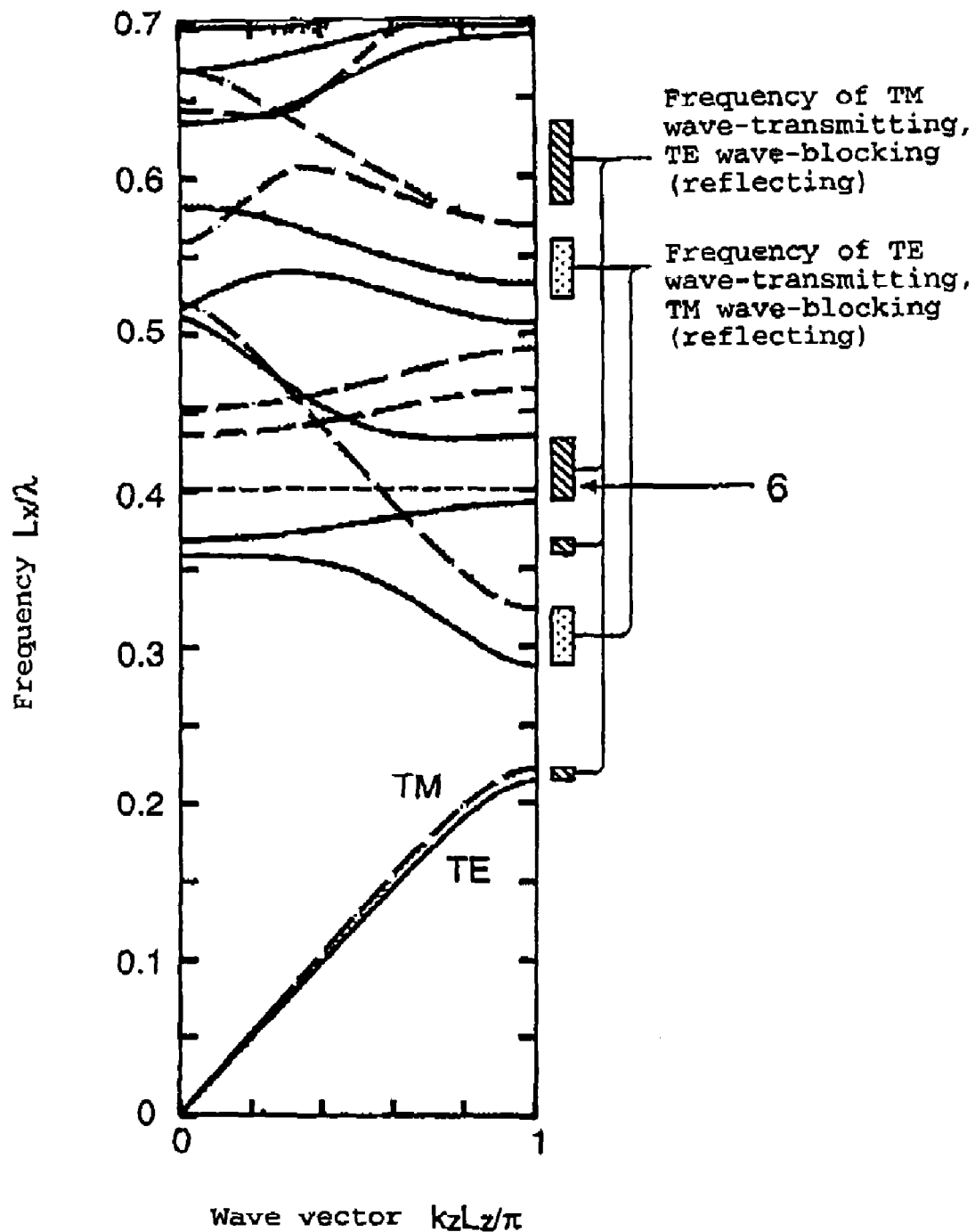
FIG. 4 illustrates the relation between the frequency and the wave motion vector in Example 1.

FIG. 4 illustrates the relation between the frequency and the wave motion vector in the regularly arranged structure as calculated by the FDTD method (Finite Difference Time Domain method) using the regularly arranged boundary condition. The analysis of the band structure and light transmission properties of a photonic crystal by the FDTD method was reported by S. Fan et al. (Physical Review B, vol. 54, no. 16, pp. 11245–11251 (1996)). In FIG. 4, the abscissa is a relative value of a magnitude of the wave motion vector, and the ordinate is a relative value of frequency Lx/1, wherein 1 is a wavelength of the emitted light, and kz is a z-component of the wave motion vector. The solid and dashed lines are dispersion curves in TE and TM waves, respectively. Lx=0.4 mm and 1=1 mm give a frequency (Lx/1) of 0.4. As understood from FIG. 4, the line Lx/1=0.4 does not cross the dispersion curve of TE wave (solid line), but crosses the dispersion curve of TM wave (dashed line). This means that TE wave is blocked/reflected, and that TM wave is transmitted. Namely this regularly arranged structure works as a polarizer which transmits TM wave in a frequency band 6 which has a frequency (Lx/1) of 0.39 to 0.43.

EXAMPLE 2

This example will illustrate that a polarizer is obtained which has excellent properties even if parameters such as the uniformity of the thickness of the layer of each dielectric band in the plane, the shape of grooves, and an Lz-Lx ratio are different from those of Example 1.

Figure 5:
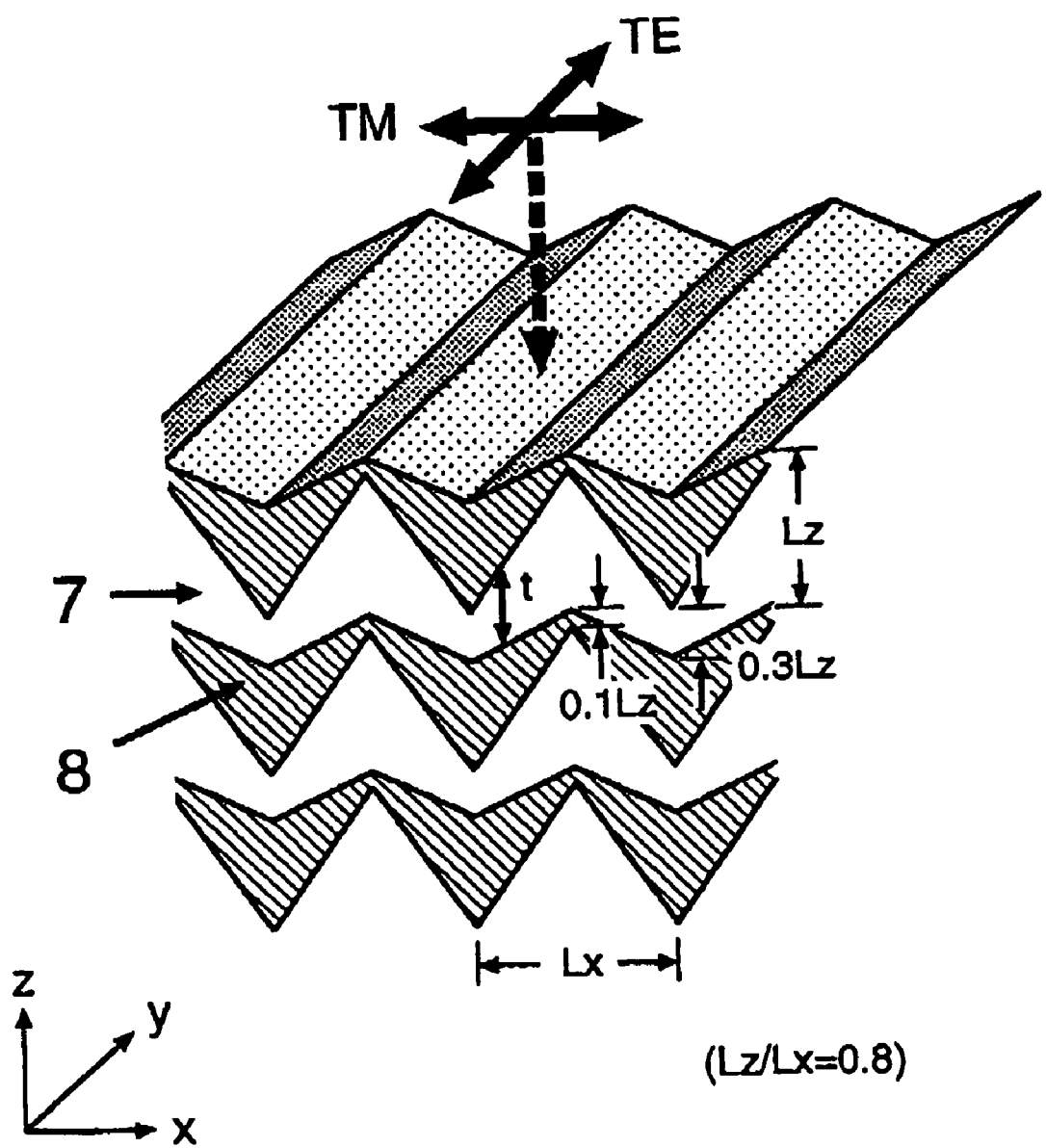
FIG. 5 illustrates the structure of a polarizer of Example 2.

FIG. 5 illustrates the constitution fo other examples of the present invention including amorphous $SiO_2$ layer 7 and amorphous Si layer 8. A pitch along x-axis (Lx) is 0.4 mm, and a pitch along z-axis (Lz) is 0.32 mm. This polarizer has the structure in which $SiO_2$ and Si layers are regularly bent changing the thickness of the $SiO_2$ layer between 0.9 Lz and 0.3 Lz, and changing the thickness of Si layer between 0.1 Lz and 0.7 Lz. To prepare the laminated films, although the same substrate was used as that of Example 1, a different condition was used for bias spattering for forming $SiO_2$ and Si layers.

Figure 6:
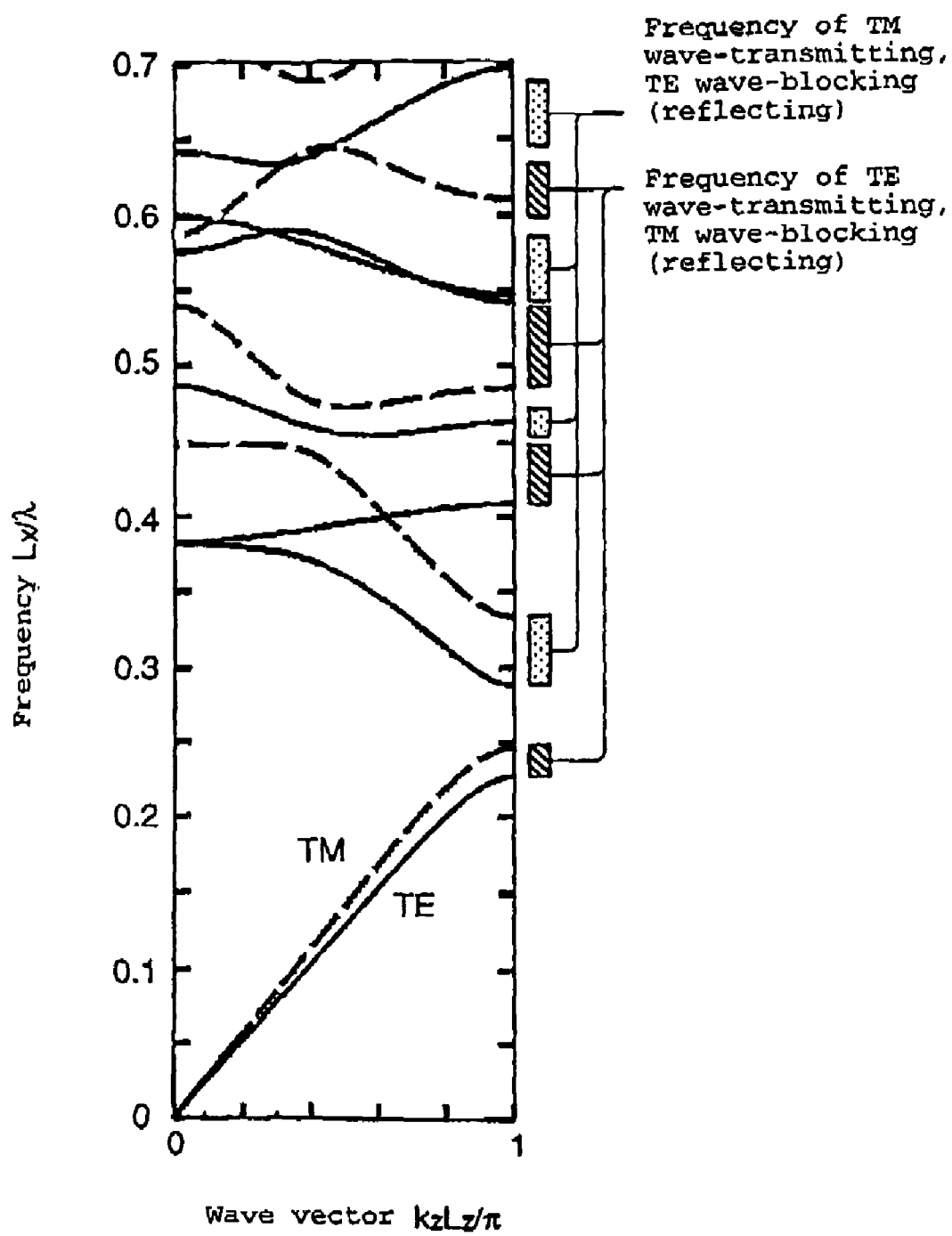
FIG. 6 illustrates the relation between the frequency and the wave motion vector in Example 2.

FIG. 6 illustrates the relation between the frequency and the wave motion vector in this regularly arranged structure as calculated by the FDTD method. The abscissa is a relative magnitude of the wave motion vector, and the ordinate is a relative frequency. The solid and dashed lines are dispersion curves in TE and TM waves. As understood from FIG. 6, this polarizer has a wider frequency band to work as a polarizer than that of Example 1. It is preferable that the frequency width is wide also for a polarizer which is sued at a single frequency of light with respect to one band gap. Because at a frequency which is not sufficiently distant from the end of the band gap, the frequency along z-axis which is necessary to take a sufficiently large extinction ratio increases.

In Examples 1 and 2, although a ratio of the pitch along z-axis and that of x-axis (Lz/Lx) is 0.8, from other calculations by the FDTD method, it is known that the polarizer works even at a ratio of approximately 0.2. Although the pitch along x-axis (1x) is selected to be a wavelength of the light or less when used as a normal polarizer, it is known that it is better to select a pitch (1x) which is longer than the wavelength of the light for a polarizing element which transmits one polarized light and diffracts the other polarized light. It is also known from other calculations that grooves need not be uniform along the y-axis, can have a different regularly arranged structure with respect to the width and gap of grooves along the x-axis, or can have random lengths which are sufficiently long along the y-axis.

Although the bias spattering method was used as a means to repeatedly laminate unit layers in this example, the degree of freedom in designing the shape of the unit layer of the lamination can be enhanced by adding a method of performing the deposition process and the spattering process non-simultaneously. As a less refractive medium, optical glass such as Pyrex glass can be used as will as amorphous $SiO_2$. As a more refractive medium, $TiO_2$, $TaO_2O_5$, and the like can be used as will as Si. The cross-sectional shape of the groove of the substrate can be rectangular as well as V-shaped. Various shapes of cross-section of groove can be formed by appropriately selecting the condition fo bias spattering.

In order to use laminated films which were thus prepared as a polarizer, non-reflecting coatings are applied on the surface and the plane which is opposite to the substrate, and the obtained films are cut. Many elements can be prepared in a batch. In addition, polishing is not necessary, and cutting process is simple. As a result, polarizers can be provided inexpensively. The thickness of laminated films excluding substrate is several micrometers, so that the polarizer can be used with vertical incidence or with a small incidence angle. Therefore, wide application is possible as a small isolator for optical communication and so on. When the polarizer is used a polarized light-separating element for an optical circulator and so on, the polarizer might be used being inclined much to the incident light. Even in such a case, the light does not transmit the section, so that polishing is not necessary.

A polarizer which is prepared by film-forming method including spattering-etching action according to the present invention has a minute thickness along the direction of transmission of the light, and can be prepared as large laminated films in one film-forming process. Polishing is not necessary and cutting is easy when each is prepared. It is possible to design a polarizer which has excellent polarization properties corresponding to a wavelength region to be used. Such a polarizer is most suitable for an optical isolator. Such a polarizer can be widely industrially used, for example, as an optical switch, and can be substituted for conventional polarizers.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A polarizer comprising:
    a multilayered structure having two or more transparent layers disposed along a z-axis of a three-dimensional orthogonal coordinate system (x, y, z) associated with the polarizer, at least two said layers having different refractive indices relative to one another,
    each said layer having a shape, each said layer being a unit of lamination, the shape of each said layer being in a form of an undulated structure, said undulated structure consisting of a set of co-directed undulations, said undulated structure being a regularly or non-regularly undulated structure, at least one of said layers having a variable thickness,
    the lamination along the z-axis repeating the shape and being configured to polarize light incident upon said multilayered structure.

2. The polarizer according to claim 1, wherein the polarizer has a first refractive medium layer containing at least one of Si and $TiO_2$ as a main component and a second refractive medium layer containing $SiO_2$ as a main component.

3. A method for producing a polarizer comprising the steps of:
    laminating on a substrate a first refractive medium layer and a second refractive medium layer with a regularly repeating shape, at least one of said first medium layer and said second medium layer having a variable thickness, said laminating performed by a film-forming method at least partly including a step of sputter etching said first refractive medium layer and said second refractive medium layer, said substrate having at most one of each of a single set of regularly arranged, co-directed grooves, a single set of regularly arranged, co-directed projections, a single set of non-intersecting projections, and a single set of co-directed, non-intersecting grooves.

4. A method of producing a polarizer, comprising the steps of:
    laminating on a substrate a first refractive medium layer which contains at least one of Si and $TiO_2$ as a main component and a second refractive medium layer which contains $SiO_2$ as a main component with a regularly repeating shape, at least one of said first medium layer and said second medium layer having a variable thickness, said laminating performed by a film-forming method at least partly including a step of sputter etching said first refractive medium layer and said second refractive medium layer, said substrate having at most one of each of a single set of regularly arranged, co-directed grooves, a single set of regularly arranged, co-directed projections, a single set of non-intersecting projections, and a single set of co-directed non-intersecting grooves.

5. The polarizer according to claim 1, wherein the respective shape of at least one of said layers having a regularly undulated structure along the x-axis and being uniform along a y-axis.

6. The polarizer according to claim 1, wherein said first refractive medium layer has a first index of refraction, said second refractive medium layer has a second index of refraction, said first index of refraction being greater than said second index of refraction.

7. The method for producing a polarizer according to claim 3, wherein said substrate has at least one of said thin and long projections and said thin and long grooves.

* * * * *